Mar. 13, 1923.
J. F. O'CONNOR.
FRICTION SHOCK ABSORBING MECHANISM.
FILED MAY 31, 1921.
1,448,500.
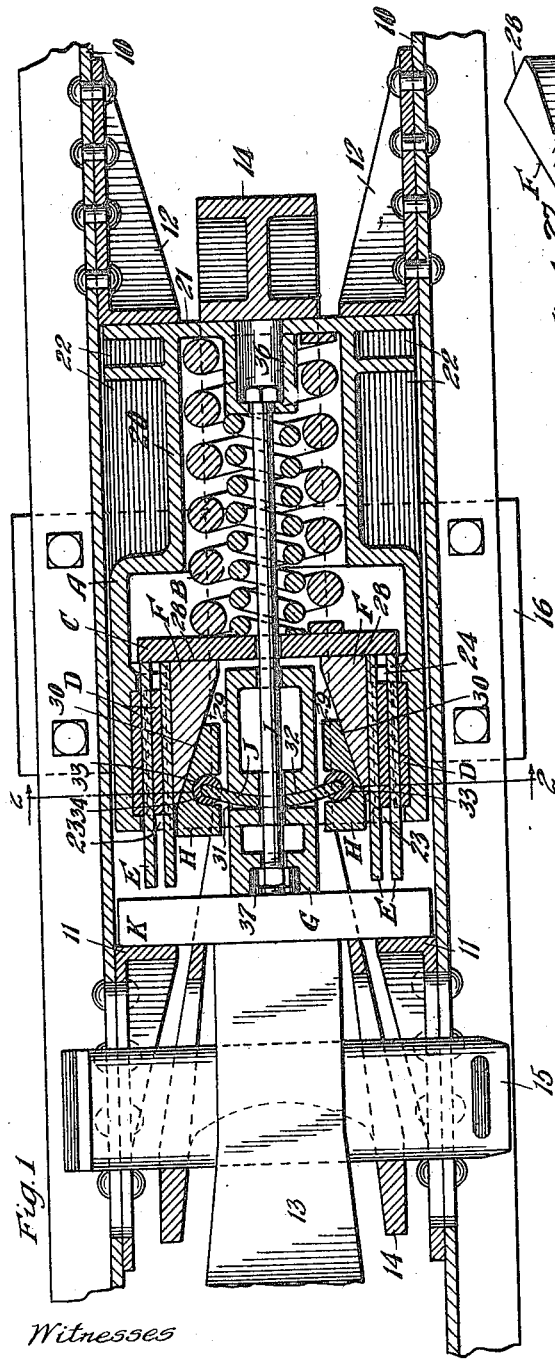
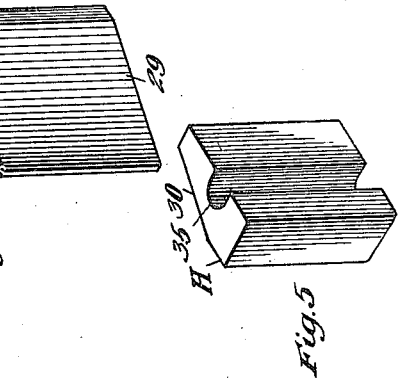
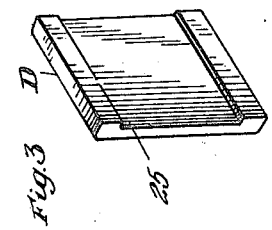
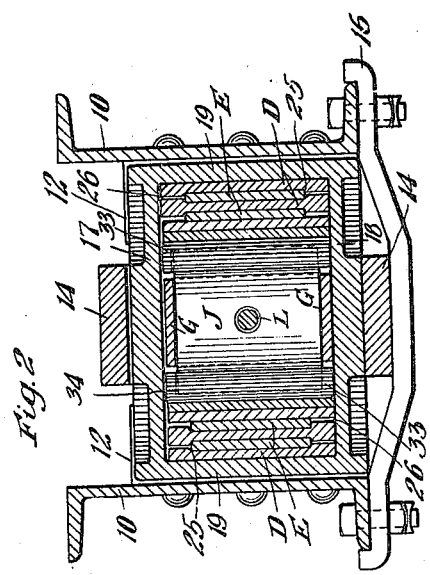
Witnesses
Wm. Geiger
Inventor
John F. O'Connor
By Geo. I. Haight
His Atty Patented Mar. 13, 1923.

1,448,500

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed May 31, 1921. Serial No. 473,765.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock-absorbing mechanisms.

One object of the invention is to provide a high capacity friction shock absorbing mechanism especially adapted for railway draft riggings and wherein is obtained certain release, large frictional wearing areas, low pressure per unit of friction wearing areas, and relatively small peak or maximum load transmitted to the car underframe or other structure on which the mechanism is mounted.

More specifically, the object of my invention is to provide a shock absorbing mechanism possessing the general characteristics above indicated, and wherein is employed a novel type of lateral pressure or wedging means which may be manufactured at comparatively small expense.

Other objects of the invention will more clearly appear from the description and claims hereinafter following.

In the drawing forming a part of this specification, Figure 1 is a horizontal longitudinal sectional view of a portion of a railway draft rigging showing my improvements in connection therewith. Fig. 2 is a vertical transverse sectional view corresponding substantially to the line 2—2 of Fig. 1. And Figs. 3, 4 and 5 are detail perspectives of one of the stationary friction plates, one of the friction wedge shoes, and one of the wedge elements, respectively.

In said drawing, 10—10 denote channel draft sills in a railway car, to the inner faces of which are secured front stop lugs 11 and rear stop lugs 12. The rear or inner portion of a drawbar is indicated at 13, the same being operatively associated with the shock absorbing mechanism proper by means of a hooded cast yoke 14 and coupler key 15. The shock absorbing mechanism is contained within the yoke and is supported in operative position in conjunction with the yoke by a detachable saddle plate 16.

The improved shock absorbing mechanism proper, as shown, comprises, broadly, a column-load-sustaining member A, sometimes called a shell or follower member; a spring resistance B; a spring follower C; a series of relatively stationary friction elements D; a series of relatively movable friction elements E; a pair of wedge shoes F—F; a pressure-transmitting block G; a pair of wedge elements H—H; a spreader element J; a front follower K; and a retainer bolt L.

The member A is preferably in the form of a malleable casting and at its forward and outer end is of rectangular box-like form having an upper wall 17, lower wall 18 and side walls 19—19. Rearwardly of the box-like section or casing thus formed, the casting A is designed with a cylindrical section 20 forming a cage and centering means for the single spring B. At its rear end, the member A is formed with an integral transverse wall 21 acting as a rear follower in conjunction with the stop lugs 12. The casting is suitably reenforced by strengthening flanges 22—22 rearwardly of the casing.

Within the rectangular casing section, the casting A is provided with upper and lower pairs of aligned relatively short transversely extending ribs 23 and 24. The ribs 23 obviously provide rearwardly-facing shoulders and the ribs 24 forwardly-facing shoulders, and between said shoulders are mounted the stationary friction elements D, which are preferably in the form of flat plates channeled on opposing sides to provide longitudinally extending guides or grooves 25. With this construction, it will be apparent that the plates D are prevented from longitudinal movement with respect to the member A, but are, nevertheless, freely responsive to laterally applied pressure.

The movable friction plates are of the ordinary rectangular form, and are alternated with the stationary plates D. The width of the plates E is such that they slide within the channel guides 25 and the thickness of the plates E is such as to provide for a narrow space 26 between the thickened edges of the plates D, as clearly shown in Fig. 2. In normal position of the parts, the forward ends of the plates E project outwardly from the shell, and at their rear ends project inwardly of the rear ends of the stationary plates D, the inner ends of the plates E normally engaging the spring follower F, as shown in Fig. 1. In actual practice, the series of stationary and movable plates D and E will be divided into two groups, one on each side of the center line, thereby leaving a space therebetween for the wedging or lateral-pressure-creating system.

Each of the wedge shoes F is of triangular form having an outer flat face 27 engaging against the opposed inner face of a movable plate E. At its inner end, each member F is provided with a flat transverse face 28 bearing against the spring follower C. On its inner side, each member F is formed with an inclined wedge face 29 adapted to co-operate with the corresponding engaging wedge face 30 of the wedge element H.

The pressure-transmitting block G is preferably in the form of a casting, suitably cored, as indicated, and bears at its outer end against the inner face of the front follower K. Intermediate its ends, the block G is provided with a transversely extending opening 31 defined on the forward side by a flat surface and on the inner side by a convex surface, the latter being indicated at 32. Extending through said opening 31 is the spring steel-tempered plate J, which, in normal condition, is bowed or convex, as shown in Fig. 1. Applied to the opposite ends of said plate J, are cylindrical bushings 33, suitably slotted on their inner sides, as indicated at 34, to receive the edges of the plate J. Said bushings 33 are received in corresponding cylindrical recesses 35 provided on the inner sides of the wedge elements H. At its inner end the block G is normally slightly spaced from the follower C, as shown in Fig. 1, and normally, the follower K is slightly spaced from the outer ends of the movable friction plates E, all for the purpose hereinafter described.

The retainer bolt L is anchored at its rear end in a hollow boss 36 provided in the casting A, and, at its forward end, is anchored in a suitable recess 37 of the block G. The bolt extends through the follower C, block G and spring plate J, all of the latter being suitably apertured for this purpose.

The operation of the mechanism is as follows, assuming an inward or buffing movement of the drawbar. As the drawbar moves inwardly, the follower K is forced rearwardly simultaneously therewith. This in turn actuates the block G rearwardly, and initially there is no actuation of the plates E or of the spring follower C. Owing to the initial resistance obtaining between the shoes F and the innermost movable plates E, the spreader plate J does or tends to straighten out, thereby increasing the lateral pressure exerted on the wedge elements H and from the latter on the shoes F. During this flexing of the plate J, it is evident that the bushings 33 function substantially as pivotal bearings thereby facilitating the action of the parts. As the movement of the drawbar and follower K inwardly continues, and as the plate J tends to flatten out, the entire system of block G, wedge elements H and shoes F moves rearwardly a slight distance relatively to the intercalated friction plates, until the spring follower C is removed from engagement with the inner ends of the plates E. After approximately a half-inch movement of the front follower K, the latter then engages the ends of the movable plates E, and thereafter the plates E are pushed rearwardly, thus generating friction between said plates E and the stationary plates D. At the beginning of the actuation of the movable plates E, it will be observed that the desired degree of spreading or wedging action has been produced, and said action is dependent upon the degree of compression of the spring B and is not determined by the force of the actuating blow. For this reason, I am enabled to effectively limit the degree of laterally exerted pressure on the intercalated friction plates, and also to avoid the possibility of the plate J being flexed beyond its elastic limit. On account of the large amount of frictional wearing areas the total resistance is many times the resistance of the spring B, so that I am enabled to obtain a high capacity. Furthermore, it will be observed that the area of friction surfaces in contact always remains the same, so that I am enabled to obtain a graduated and smooth action and absorption of the shock throughout the entire stroke. This latter feature also enables me to keep the ultimate or peak load transmitted to the underframe at a comparatively small figure, so that the draft lugs and draft sills are not subjected to destructive blows.

During release, after the removal of the actuating force, the spring B immediately expands and begins to project the wedge shoes F and wedge elements H outwardly. Simultaneously, the spring plate J also tends to resume its normal condition, thus forcing the block G outwardly relatively to the wedge elements H. During this initial portion of the release action, the spring follower C is free from engagement with the friction plates E, and, consequently the wedging pressure is reduced substantially to a minimum before the follower C comes into engagement with the inner ends of the plates E. After the follower C has engaged the ends of the plates E, the latter are easily projected outwardly to the their normal position under the continued expansion of the spring B.

I have herein shown and described what I now consider the preferred manner of carrying out the invention, but the same is merely illustrative, and I contemplate all changes and modifications that come within the scope of the claims appended hereto.

I claim:

1. In a friction shock absorbing mechanism, the combination with a column-load-sustaining member having interior longitudinally extending friction surfaces; of a spring resistance; wedge friction shoes co-operable with said surfaces; and means for creating lateral pressure upon a longitudinal movement of said friction shoes during a compression stroke, said means including wedge elements co-operable with said shoes, and a resilient curved rectangular plate interposed between said wedge elements, said plate being flexed upon application of longitudinally directed forces.

2. In a friction shock absorbing mechanism, the combination with a column-load-sustaining member having interior longitudinally extending friction surfaces; of a spring resistance; wedge friction shoes co-operable with said surfaces; and means for creating lateral pressure upon a longitudinal movement of said friction shoes during a compression stroke, said means including wedge elements co-operable with said shoes, a resilient curved plate disposed between said wedge elements, and rounded bushings on the edges of said plate, said wedge elements having correspondingly formed recesses to accommodate said bushings.

3. In a friction shock absorbing mechanism, the combination with a column-load-sustaining member having interior longitudinally extending friction surfaces; of a spring resistance; wedge friction shoes co-operable with said surfaces; and means for creating lateral pressure upon a longitudinal movement of said friction shoes during a compression stroke, said means including a pair of laterally-spaced wedge elements, and an outwardly bowed transversely extending elongated spring plate interposed between said wedge elements.

4. In a friction shock absorbing mechanism, the combination with a column-load-sustaining member having interior longitudinally extending friction surfaces; of a spring resistance; wedge friction shoes co-operable with said surfaces; and means for creating lateral pressure upon a longitudinal movement of said friction shoes during a compression stroke, said means including wedge elements co-operable with said shoes, a resilient curved plate interposed between said wedge elements, and a pressure-transmitting block extending outwardly and inwardly of said plate, said block being recessed transversely to accommodate said plate therein.

5. In a friction shock absorbing mechanism, the combination with a column-load-sustaining member having a casing at one end; of a plurality of relatively stationary friction plates disposed within said casing and held against longitudinal movement with respect thereto; a plurality of movable friction plates intercalated with respect to said first-named plates, said stationary and movable plates being divided into separate groups; a spring resistance and means for creating lateral pressure on said groups of plates, said means including friction shoes on the inner side of each group, wedge elements co-operable with said shoes, and an elongated resilient curved plate interposed between said wedge elements.

6. In a friction shock absorbing mechanism, the combination with a column-load-sustaining member having a casing at one end; of a plurality of relatively stationary friction plates disposed within said casing and held against longitudinal movement with respect thereto; a plurality of movable friction plates intercalated with respect to said first-named plates, said stationary and movable plates being divided into separate groups; a spring resistance; and means for creating lateral pressure on said groups of plates, said means including wedge friction shoes on the inner sides of said groups of plates, wedge elements co-operable with said shoes, a resilient curved plate located between said wedge elements, and rounded bushings on the edges of said plate, said wedge elements having correspondingly shaped recesses to accommodate said bushings.

7. In a friction shock absorbing mechanism, the combination with a column-load-sustaining member having a casing at one end; of a plurality of relatively stationary friction plates disposed within said casing and held against longitudinal movement with respect thereto; a plurality of movable friction plates intercalated with respect to said first-named plates, said stationary and movable plates being divided into separate groups; a spring resistance; and means for creating lateral pressure on said groups of plates, said means including a pair of laterally spaced wedge friction shoes, a pair of wedge elements co-operable with said shoes, and a transversely extending elongated bowed spring plate interposed between said wedge elements.

8. In a friction shock absorbing mechanism, the combination with a column-load-sustaining member having a casing at one end; of a plurality of relatively stationary friction plates disposed within said casing and held against longitudinal movement with respect thereto; a plurality of movable friction plates intercalated with respect to said first-named plates, said stationary and movable plates being divided into separate groups; a spring resistance; and means for creating lateral pressure on said groups of plates, said means including a pair of laterally spaced wedge friction shoes, a pair of wedge elements co-operable with said shoes, a transversely extending bowed spring plate interposed between said wedge elements, and a pressure-transmitting block extending outwardly and inwardly of said plate, said block being transversely recessed to accommodate said spring plate therein.

9. In a friction shock absorbing mechanism, the combination with a follower-acting member having a substantially rectangular open-end casing at one end; of a plurality of relatively stationary friction plates mounted within said casing and held against longitudinal movement with respect thereto but freely responsive to lateral pressure; a plurality of longitudinally movable friction plates alternated with respect to said stationary plates, said movable and stationary plates being divided into two laterally separated groups; a spring resistance; a wedge friction shoe on the inner side of each group of plates; a pair of wedge elements co-operable with said shoes; a pressure-transmitting block; an outwardly bowed spring plate disposed between said wedge elements, said block being transversely recessed to accommodate said plate; and rounded bushings on the ends of said plate, said wedge elements having correspondingly shaped recesses to accommodate said bushings.

10. In a friction shock absorbing mechanism; the combination with a column-load-sustaining member, having interior longitudinally extending friction surfaces; of a spring resistance; a spring follower; wedge-friction-shoes cooperable with said surfaces, and means for creating lateral pressure upon longitudinal movement of said friction shoes during the compression stroke, said means including wedge elements co-operable with said shoes, a resilient curved plate interposed between said wedge elements, and a column arranged in limited spaced relation relative to said follower and engaging the inner side of said plate.

In witness that I claim the foregoing I have hereunto subscribed my name this 24th day of May, 1921.

JOHN F. O'CONNOR.

Witnesses:
CARRIE GAILING,
ANN BAKER.